(12) United States Patent
Yoshida et al.

(10) Patent No.: US 10,967,697 B2
(45) Date of Patent: Apr. 6, 2021

(54) AIR SUSPENSION SYSTEM

(71) Applicant: HITACHI AUTOMOTIVE SYSTEMS, LTD., Ibaraki (JP)

(72) Inventors: Yuki Yoshida, Tokyo (JP); Kan Kobayashi, Yokohama (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 163 days.

(21) Appl. No.: 16/086,429

(22) PCT Filed: Mar. 15, 2017

(86) PCT No.: PCT/JP2017/010364
§ 371 (c)(1),
(2) Date: Sep. 19, 2018

(87) PCT Pub. No.: WO2017/169772
PCT Pub. Date: Oct. 5, 2017

(65) Prior Publication Data
US 2019/0100069 A1    Apr. 4, 2019

(30) Foreign Application Priority Data

Mar. 29, 2016  (JP) .............................. JP2016-066028

(51) Int. Cl.
*B60G 17/052*    (2006.01)
*B60G 17/04*    (2006.01)
*B60G 17/056*    (2006.01)

(52) U.S. Cl.
CPC ....... *B60G 17/0424* (2013.01); *B60G 17/052* (2013.01); *B60G 17/056* (2013.01);
(Continued)

(58) Field of Classification Search
CPC .................. B60G 17/0523; B60G 17/0525
See application file for complete search history.

(56) References Cited

U.S. PATENT DOCUMENTS 4,826,141 A * 5/1989 Buma ................ B60G 17/0155
  188/266.2
4,852,906 A * 8/1989 Buma .................. B60G 17/016
  280/5.507

(Continued)

FOREIGN PATENT DOCUMENTS

JP    04-297316    10/1992
JP    2881783    4/1999

(Continued)

OTHER PUBLICATIONS

International Search Report dated Jun. 13, 2017 in International (PCT) Application No. PCT/JP2017/010364.

*Primary Examiner* — Nicole T Verley
(74) *Attorney, Agent, or Firm* — Wenderoth, Lind & Ponack, L.L.P.

(57) ABSTRACT

An air suspension system capable of raising both the vehicle front wheel side and the vehicle rear wheel side by using a single tank. The air suspension system (1) includes a front wheel-side air suspension (2) and a rear wheel-side air suspension (7) which are interposed between a vehicle body and associated axles to perform vehicle height adjustment in response to supply and discharge of air, a compressor (17) for compressing air, and a tank (27) for storing air compressed by the compressor. When the vehicle height is to be raised by the air suspensions, the front wheel-side air suspension is supplied with compressed air from the tank, and the rear wheel-side air suspension is supplied with compressed air from the tank after the compressed air has been pressurized by the compressor.

3 Claims, 11 Drawing Sheets

(52) U.S. Cl.
CPC ..... *B60G 17/0525* (2013.01); *B60G 17/0565* (2013.01); *B60G 2500/02* (2013.01); *B60G 2500/2012* (2013.01); *B60G 2500/2021* (2013.01); *B60G 2600/66* (2013.01)

(56) References Cited

U.S. PATENT DOCUMENTS

| | | | | |
|---|---|---|---|---|
| 4,856,798 | A * | 8/1989 | Buma | B60G 17/016 280/5.507 |
| 4,881,753 | A | 11/1989 | Shima et al. | |
| 4,911,617 | A * | 3/1990 | Buma | B60G 17/052 417/439 |
| 5,159,554 | A * | 10/1992 | Buma | B60G 17/0155 280/5.513 |
| 7,032,895 | B2 * | 4/2006 | Folchert | B60G 17/0523 267/64.28 |
| 8,448,951 | B2 * | 5/2013 | Hein | B60G 17/0523 280/124.16 |
| 8,490,991 | B2 * | 7/2013 | Folchert | B01D 53/261 280/124.16 |
| 8,532,875 | B2 * | 9/2013 | Engelhardt | B60G 17/0523 701/37 |
| 8,876,122 | B2 * | 11/2014 | Gall | B60G 11/27 280/5.514 |
| 9,062,571 | B2 * | 6/2015 | Frank | F01L 1/34 |
| 2002/0136645 | A1 * | 9/2002 | Folchert | B60G 17/0523 417/302 |
| 2019/0100070 | A1 * | 4/2019 | Ito | B60G 17/0525 |

FOREIGN PATENT DOCUMENTS

| | | | | |
|---|---|---|---|---|
| JP | 2002-087040 | | 3/2002 | |
| JP | 2002-337531 | | 11/2002 | |
| JP | 2004034985 | A * | 2/2004 | ........ B60G 17/0523 |
| JP | 2012180020 | A * | 9/2012 | |
| JP | 2015016776 | A * | 1/2015 | |
| JP | 2015054643 | A * | 3/2015 | |
| JP | 2015105020 | A * | 6/2015 | |
| JP | 2017065364 | A * | 4/2017 | |
| JP | 2017114239 | A * | 6/2017 | ........ B60G 17/0525 |
| JP | 6268777 | B2 * | 1/2018 | |

* cited by examiner

US 10,967,697 B2

AIR SUSPENSION SYSTEM

BACKGROUND OF THE INVENTION

1. Technical Field

The present invention relates to air suspension systems installed in vehicles, for example, four-wheel automobiles.

2. Description of the Related Art

Four-wheel automobiles or other vehicles include those equipped with an air suspension system for performing vehicle height adjustment (for example, see Japanese Patent Application Laid-Open Publication No. 2002-337531). An air suspension system according to the conventional technique of the type described above has a front wheel-side air suspension and a rear wheel-side air suspension which are interposed between a vehicle body and associated axles to perform vehicle height adjustment in response to supply and discharge of air, and further has a compressor compressing air, and a tank storing air compressed by the compressor.

SUMMARY OF THE INVENTION

1. Technical Problem

A vehicle equipped with an air suspension system of the type described above is generally configured such that, when the vehicle height is to be raised, raising the vehicle height of the vehicle front wheel side and raising the vehicle height of the vehicle rear wheel side are alternately performed according to the weight of the front wheel side and the weight of the rear wheel side.

Incidentally, an air suspension system such as that described in JP 2002-337531 is desired to be capable of raising the vehicle height rapidly without causing an increase in size of the system.

An object of the present invention is to provide an air suspension system capable of raising both the vehicle front wheel side and the vehicle rear wheel side with a single tank.

2. Solution to the Problem

An air suspension system according to one embodiment of the present invention includes a front wheel-side air suspension and a rear wheel-side air suspension which are interposed between a vehicle body and associated axles to perform vehicle height adjustment in response to supply and discharge of air, and further includes a compressor compressing air, and a tank storing air compressed by the compressor. When the vehicle height is to be raised by the air suspensions, either one of the front wheel-side air suspension and the rear wheel-side air suspension is supplied with compressed air from the tank, and the other of the front wheel-side air suspension and the rear wheel-side air suspension is supplied with compressed air from the tank after the compressed air has been pressurized by the compressor.

According to one embodiment of the present invention, both the vehicle front wheel side and the vehicle rear wheel side can be raised with a single tank.

DETAILED DESCRIPTION OF EMBODIMENTS OF THE INVENTION

Air suspension systems according to embodiments of the present invention will be explained below in detail with reference to the accompanying drawings by taking, as an example, a case where the air suspension system is installed in a vehicle, e.g. a four-wheel automobile.

Figure 1:
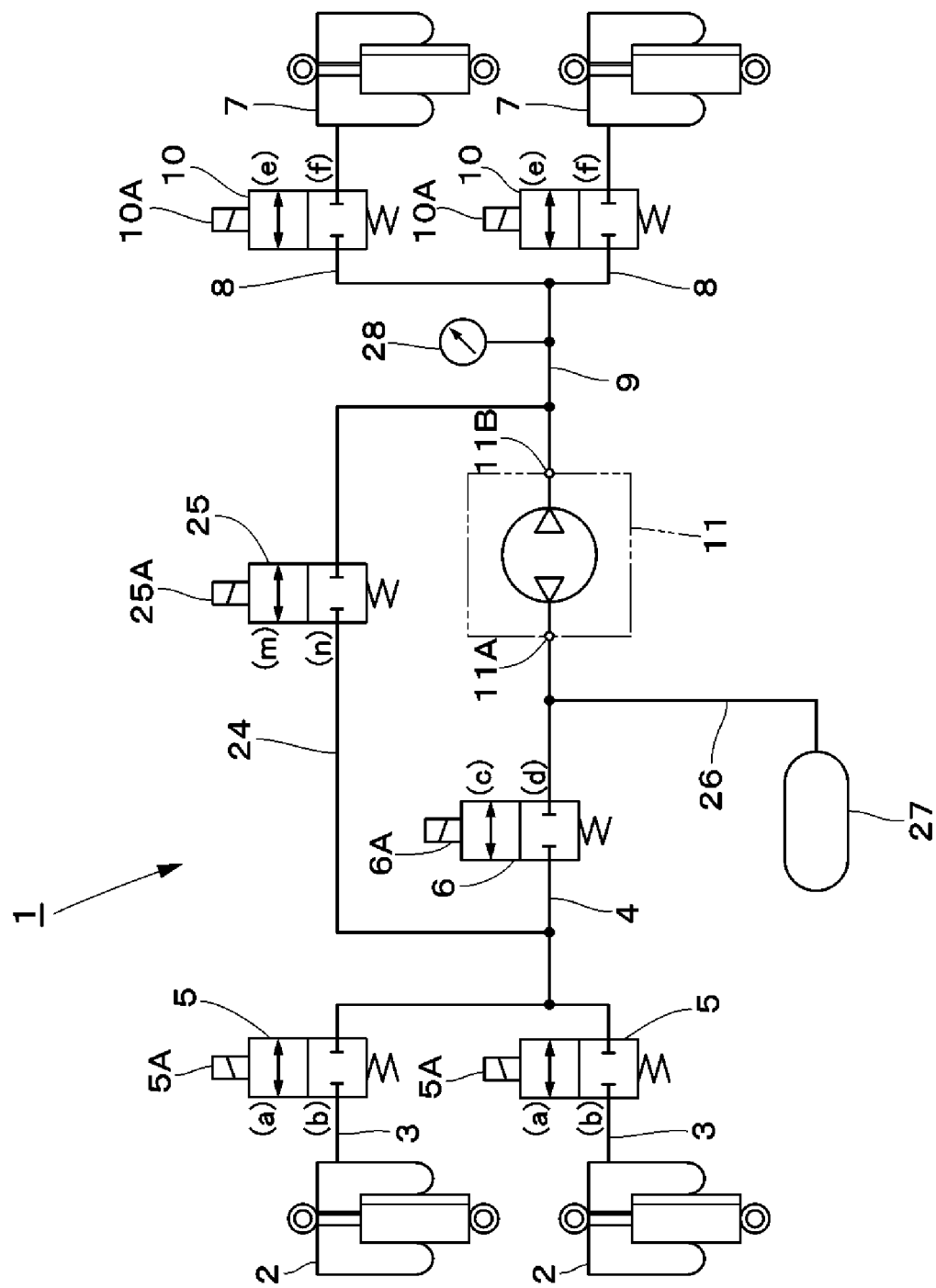
FIG. 1 is a circuit diagram showing an overall structure of an air suspension system according to a first embodiment.

First, FIGS. 1 to 7 show a first embodiment of the present invention. In FIG. 1, a vehicle-mounted air suspension system 1 is constructed by including a front wheel-side air suspension 2, a rear wheel-side air suspension 7, a compression unit 11, a tank 27, and a controller 30.

The front wheel-side air suspension 2 is provided at the front wheel side of the vehicle, being interposed between body- and axle-side members (not shown) of the vehicle. Specifically, there are provided two front wheel-side air suspensions 2 in association with the front left and right wheels, respectively. The front wheel-side air suspensions 2 are configured such that when compressed air is supplied thereto or discharged therefrom, the front wheel-side air suspensions 2 extend or contract vertically according to the amount of air supplied or discharged (amount of compressed air) at that time, thereby performing height adjustment of the vehicle. The front wheel-side air suspensions 2 are connected to a tank 27 through respective front branch lines 3 and a front supply-discharge line 4.

The front branch lines 3 are connected at one end thereof to the left and right front wheel-side air suspensions 2, respectively, and connected at the other end thereof to the front supply-discharge line 4. Front supply-discharge valves 5 are provided halfway in the front branch lines 3, respectively.

The front supply-discharge line 4 is connected at one end thereof to the front branch lines 3 and connected at the other end thereof to a front connection point 11A of a compression unit 11 (described later). A front switching valve 6 is provided halfway in the front supply-discharge line 4.

The front supply-discharge valves 5 are provided in the front branch lines 3, respectively, between the associated front wheel-side air suspensions 2 and the front switching valve 6. The front supply-discharge valves 5 each comprise a 2-port, 2-position electromagnetic valve having a solenoid (coil) 5A and are switching-controlled by a controller 30 (described later). The front supply-discharge valves 5 are each selectively switched in response to an electric current supplied to the solenoid 5A from the controller 30 between an open position (a) where the front supply-discharge valve 5 opens the associated front branch line 3 to allow supply or discharge of compressed air to or from the associated front wheel-side air suspension 2, and a closed position (b) where the front supply-discharge valve 5 closes the associated front branch line 3 to block the supply or discharge of compressed air to or from the associated front wheel-side air suspension 2. In other words, the front supply-discharge valves 5 constitute a front wheel-side switching section switching the communication state between the front wheel-side air suspensions 2 and the tank 27.

The front switching valve 6 is provided in the front supply-discharge line 4 between the front supply-discharge valves 5 and the compression unit 11. The front switching valve 6 comprises a 2-port, 2-position electromagnetic valve having a solenoid 6A and is switching-controlled by a controller 30 (described later). The front switching valve 6 is selectively switched in response to an electric current supplied to the solenoid 6A from the controller 30 between an open position (c) where the front switching valve 6 opens the front supply-discharge line 4 to allow supply or discharge of compressed air to or from the front wheel-side air suspensions 2, and a closed position (d) where the front switching valve 6 closes the front supply-discharge line 4 to block the supply or discharge of compressed air to or from the front wheel-side air suspensions 2. In other words, the front switching valve 6 constitutes, together with the front supply-discharge valves 5, the front wheel-side switching section switching the communication state between the front wheel-side air suspensions 2 and the tank 27.

The rear wheel-side air suspension 7 is provided at the rear wheel side of the vehicle, being interposed between body- and axle-side members (not shown) of the vehicle. Specifically, there are provided two rear wheel-side air suspensions 7 in association with the rear left and right wheels, respectively. The rear wheel-side air suspensions 7 are configured such that when compressed air is supplied thereto or discharged therefrom, the rear wheel-side air suspensions 7 extend or contract vertically according to the amount of air supplied or discharged (amount of compressed air) at that time, thereby performing height adjustment of the vehicle. The rear wheel-side air suspensions 7 are connected to the tank 27 through respective rear branch lines 8, a rear supply-discharge line 9, and a compression unit 11 (described later).

The rear branch lines 8 are connected at one end thereof to the rear supply-discharge line 9 and connected at the other end thereof to the rear wheel-side air suspensions 7, respectively. Rear supply-discharge valves 10 are provided halfway in the rear branch lines 8, respectively.

The rear supply-discharge line 9 is connected at one end thereof to a rear connection point 11B of a compression unit 11 (described later) and connected at the other end thereof to the rear branch lines 8. A pressure sensor 28 (described later) is connected halfway in the rear supply-discharge line 9.

The rear supply-discharge valves 10 are provided in the rear branch lines 8, respectively, at respective positions between the rear wheel-side air suspensions 7 and the compression unit 11. The rear supply-discharge valves 10 each comprise a 2-port, 2-position electromagnetic valve having a solenoid 10A and are switching-controlled by the controller 30. The rear supply-discharge valves 10 are each selectively switched in response to an electric current supplied to the solenoid 10A from the controller 30 between an open position (e) where the rear supply-discharge valve 10 opens the associated rear branch line 8 to allow supply or discharge of compressed air to or from the associated rear wheel-side air suspension 7, and a closed position (f) where the rear supply-discharge valve 10 closes the associated rear branch line 8 to block the supply or discharge of compressed air to or from the associated rear wheel-side air suspension 7. In other words, the rear supply-discharge valves 10 constitute a rear wheel-side switching section switching the communication state between the rear wheel-side air suspensions 7 and the compression unit 11.

Figure 2:
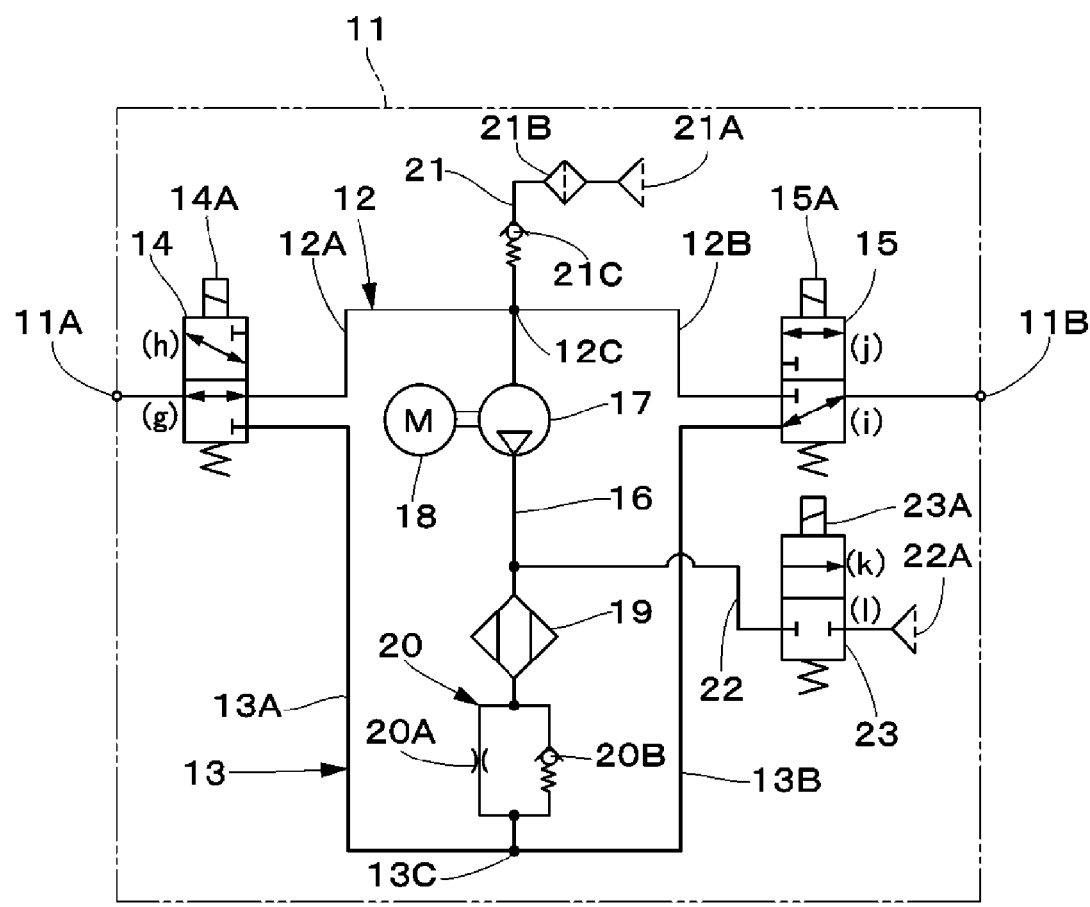
FIG. 2 is a circuit diagram showing the structure of a compression unit in FIG. 1.

The compression unit 11 is connected between the front wheel-side air suspensions 2 and the rear wheel-side air suspensions 7. Specifically, the compression unit 11 is connected at one end thereof to the front supply-discharge line 4 through the front connection point 11A and connected at the other end thereof to the rear supply-discharge line 9 through the rear connection point 11B. The compression unit 11 is, as shown in FIG. 2, constructed by including first and second vent lines 12 and 13, first and second switching valves 14 and 15, a main line 16, a compressor 17, an electric motor 18, an air dryer 19, a speed control valve 20, a suction line 21, an exhaust line 22, and so forth. The compression unit 11 constitutes a compressed air source supplying compressed air to the front wheel-side air suspensions 2 and the rear wheel-side air suspensions 7.

The first vent line 12 is connected at one end thereof to the front supply-discharge line 4 through the front connection point 11A and connected at the other end thereof to the rear supply-discharge line 9 through the rear connection point 11B. The first vent line 12 connects between the front supply-discharge line 4 and the rear supply-discharge line 9 across the suction side of the compressor 17. In this case, the first vent line 12 comprises a front first vent line 12A connecting between the front connection point 11A and a connection point 12C of a main line 16 (described later), and a rear first vent line 12B connecting between the connection point 12C of the main line 16 and the rear connection point 11B.

The front first vent line 12A is provided with a first switching valve 14 (described later). The front first vent line 12A constitutes a vent passage leading compressed air from the tank 27 to the suction side of the compressor 17 when the rear wheel-side air suspensions 7 and the compressor 17 are communicated with each other. The rear first vent line 12B is provided with a second switching valve 15 (described later).

On the other hand, the second vent line 13 is connected at one end thereof to the first switching valve 14 and connected at the other end thereof to the second switching valve 15. The second vent line 13 connects between the first switching valve 14 and the second switching valve 15 across the discharge side of the compressor 17. In this case, the second vent line 13 comprises a front second vent line 13A connecting between the first switching valve 14 and a connection point 13C of the main line 16, and a rear second vent line 13B connecting between the connection point 13C of the main line 16 and the second switching valve 15.

The first switching valve 14 is provided at one end side of the front first vent line 12A between the front switching valve 6 and the suction side of the compressor 17. The first switching valve 14 comprises, for example, a 3-port, 2-position electromagnetic direction switching valve having a solenoid 14A for selectively connecting the front supply-discharge line 4 to the suction side (first vent line 12) of the compressor 17 or the discharge side (second vent line 13) of the compressor 17, and is switching-controlled by the controller 30.

The first switching valve 14 is selectively switched in response to an electric current supplied to the solenoid 14A from the controller 30 between a supply position (g) where the first switching valve 14 allows compressed air in the tank 27 to be supplied to and discharged from the rear wheel-side air suspensions 7 through the front first vent line 12A and the main line 16, and a delivery position (h) where the first switching valve 14 allows compressed air in the air suspensions 2 and 7 to be supplied (delivered) into the tank 27 through the main line 16 and the front second vent line 13A. That is, the first switching valve 14 constitutes a switching mechanism changing the flow direction of compressed air.

The second switching valve 15 is provided at the other end side of the rear first vent line 12B between the rear supply-discharge valves 10 and the suction side of the compressor 17. The second switching valve 15 comprises, for example, a 3-port, 2-position electromagnetic direction switching valve having a solenoid 15A for selectively connecting the first vent line 12 or the second vent line 13 to the rear supply-discharge line 9, and is switching-controlled by the controller 30.

The second switching valve 15 is selectively switched in response to an electric current supplied to the solenoid 15A from the controller 30 between a supply position (i) where the second switching valve 15 allows compressed air in the tank 27 to be supplied to and discharged from the rear wheel-side air suspensions 7 through the front first vent line 12A, the main line 16, and the rear second vent line 13B, and a delivery position (j) where the second switching valve 15 allows compressed air in the air suspensions 2 and 7 to be supplied (delivered) into the tank 27 through the rear first vent line 12B, the main line 16, and the front second vent line 13A. That is, the second switching valve 15 constitutes a rear wheel-side switching mechanism switching the communication state between the rear wheel-side air suspensions 7 and the compression unit 11 by changing the flow direction of compressed air.

The main line 16 connects between the first vent line 12 and the second vent line 13. That is, one end at the upstream side of the main line 16 is connected to the connection point 12C (between the front first vent line 12A and the rear first vent line 12B) of the first vent line 12, and the other end at the downstream side of the main line 16 is connected to the connection point 13C (between the front second vent line 13A and the rear second vent line 13B) of the second vent line 13. The main line 16 constitutes a supply-discharge line for supplying and discharging compressed air to and from the air suspensions 2 and 7. The main line 16 is provided with a compressor 17, an air dryer 19, and a speed control valve 20.

The compressor 17 is provided in the main line 16. The compressor 17 comprises, for example, a reciprocating compressor or a scroll compressor. The compressor 17 is driven by an electric motor 18 as a drive source to compress air sucked in from the first vent line 12 side or from the suction line 21 side to thereby generate compressed air, and supplies the compressed air to the air dryer 19.

The air dryer 19 is provided in the main line 16 between the compressor 17 and the speed control valve 20. The air dryer 19 contains a water adsorbent (not shown). When compressed air supplied from the compressor 17 flows through the air dryer 19 in a forward direction toward the speed control valve 20, the air dryer 19 adsorbs water from the compressed air by the water adsorbent contained therein. Then, the air dryer 19 supplies dry compressed air (dry air) to the air suspensions 2 and 7. On the other hand, compressed air (exhaust) flowing in a backward direction from the air suspensions 2 and 7 or the tank 27 toward an exhaust line 22 (described later) desorbs water from the water adsorbent by flowing backward through the air dryer 19, thereby regenerating the water adsorbent.

The speed control valve 20 is provided in the main line 16 between the air dryer 19 and the second vent line 13. The speed control valve 20 comprises a parallel circuit of a restriction 20A and a check valve 20B. The speed control valve 20 is configured as follows. For the forward flow of compressed air, the check valve 20B opens, so that the flow rate of compressed air is not reduced. For the backward flow of compressed air, however, the check valve 20B closes, and at this time, the flow rate of compressed air is reduced by the restriction 20A. Accordingly, compressed air slowly flows backward through the air dryer 19 at a reduced flow rate.

The suction line 21 is provided upstream of the suction side of the compressor 17. Specifically, the suction line 21 is communicated at one end thereof with the outside through a suction port 21A and connected at the other end thereof to the first vent line 12. The suction line 21 supplies outside air or atmospheric air sucked in from the suction port 21A to the compressor 17 through a filter 21B when the compressor 17 operates. The suction line 21 is provided with a check valve 21C preventing backflow of air sucked in from the suction port 21A.

The exhaust line 22 is provided between the discharge side of the compressor 17 and the speed control valve 20. Specifically, the exhaust line 22 is connected at one end thereof to the main line 16 and communicated at the other end thereof with the outside through an exhaust port 22A. The exhaust line 22 is a line for discharging compressed air from the air suspensions 2 and 7 and the tank 27 into the outside atmospheric air. An exhaust valve 23 is provided halfway in the exhaust line 22.

The exhaust valve 23 is a valve that selectively provides or cuts off communication between the exhaust line 22, which is connected to the main line 16, and the atmosphere. The exhaust valve 23 comprises a 2-port, 2-position electromagnetic valve having a solenoid 23A and is switching-controlled by the controller 30. The exhaust valve 23 is selectively switched in response to an electric current supplied to the solenoid 23A from the controller 30 between an open position (k) where the exhaust valve 23 opens the exhaust line 22 to allow discharge of compressed air from the exhaust port 22A, and a closed position (l) where the exhaust valve 23 closes the exhaust line 22 to block the discharge of compressed air from the exhaust port 22A. That is, the exhaust valve 23 is normally closed to cut off the exhaust line 22 from the exhaust port 22A. When opened, the exhaust valve 23 allows the exhaust line 22 to communicate with the exhaust port 22A, thereby discharging (releasing) compressed air from the exhaust line 22 into the atmosphere.

A bypass line 24 is provided across the compression unit 11. Specifically, the bypass line 24 is connected at one end thereof to the front supply-discharge line 4 and connected at the other end thereof to the rear supply-discharge line 9. The bypass line 24 bypasses the compression unit 11 and delivers compressed air from the front supply-discharge line 4 straight to the rear supply-discharge line 9 or from the rear supply-discharge line 9 straight to the front supply-discharge line 4. A bypass valve 25 is provided halfway in the bypass line 24.

The bypass valve 25 is a valve selectively providing or cutting off communication through the bypass line 24. The bypass valve 25 comprises a 2-port, 2-position electromagnetic valve having a solenoid 25A and is switching-controlled by the controller 30. The bypass valve 25 is selectively switched in response to an electric current supplied to the solenoid 25A from the controller 30 between an open position (m) where the bypass valve 25 opens the bypass line 24 to provide communication between the front supply-discharge line 4 and the rear supply-discharge line 9, and a closed position (n) where the bypass valve 25 closes the bypass line 24 to cut off the communication between the front supply-discharge line 4 and the rear supply-discharge line 9.

A tank line 26 is provided halfway in the front supply-discharge line 4 between the front switching valve 6 and the first switching valve 14. Specifically, the tank line 26 is connected at one end thereof to the front supply-discharge line 4 and connected at the other end thereof to the tank 27.

The tank 27 stores (reserves) compressed air pressurized higher than the atmospheric pressure by the compressor 17. The tank 27 and the compressor 17 are connected through the front supply-discharge line 4, the front first vent line 12A, the front second vent line 13A, the main line 16, and the tank line 26. Thus, compressed air supplied from the compressor 17 is stored in the tank 27 through the main line 16, the front second vent line 13A, the front first vent line 12A, the front supply-discharge line 4, the tank line 26, etc. Compressed air stored in the tank 27 is supplied to the front wheel-side air suspensions 2 through the front supply-discharge line 4 and the front branch lines 3, and supplied to the rear wheel-side air suspensions 7 through the rear supply-discharge line 9 and the rear branch lines 8.

The pressure sensor 28 is provided halfway in the rear supply-discharge line 9 between the rear supply-discharge valves 10 and the second switching valve 15. The pressure sensor 28 detects the pressure of compressed air in the air suspensions 2 and 7 and in the tank 27 by detecting the pressure in the rear supply-discharge line 9.

The air suspensions 2 and 7 are each provided with a vehicle height sensor 29 (see FIG. 3) as a vehicle height detecting device. The vehicle height sensor 29 detects a displacement (vertical displacement) in a direction in which the associated one of the air suspensions 2 and 7 extends or contracts, and outputs a detection signal to the controller 30 (described later).

Figure 3:
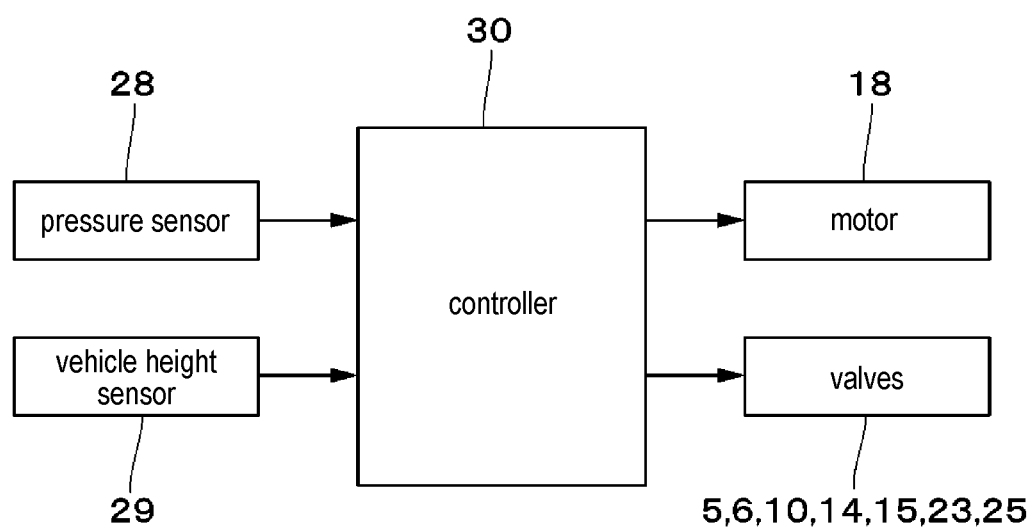
FIG. 3 is a block diagram showing a control unit of the air suspension system according to the first embodiment.

The controller 30 comprises a microcomputer or the like as a control unit controlling the supply and discharge of compressed air to and from each of the air suspensions 2 and 7. As shown in FIG. 3, the input side of the controller 30 is connected to the pressure sensor 28, the vehicle height sensor 29, and so forth, and the output side of the controller 30 is connected to the electric motor 18 and the solenoids 5A, 6A, 10A, 14A, 15A, 23A and 25A of the valves 5, 6, 10, 14, 15, 23 and 25.

The controller 30 controls driving and stopping of the electric motor 18 and on-off controls or controls opening and closing of the valves 5, 6, 10, 14, 15, 23 and 25. That is, the controller 30 controls the air suspensions 2 and 7 as vehicle height adjustment mechanisms to adjust the vehicle heights of the front and rear sides of the vehicle by controlling the valves 5, 6, 10, 14, 15, 23 and 25. The controller 30 controls driving and stopping of the electric motor 18 on the basis of detection signals input thereto from the pressure sensor 28, the vehicle height sensor 29, etc., and also controls an electric current to be supplied to each of the valves 5, 6, 10, 14, 15, 23 and 25 by changing the duty ratio of a PWM signal, for example.

The following is an explanation of the operation of the air suspension system 1 according to the embodiment having the above-described structure.

First, when compressed air is not sufficiently stored in the tank 27 (i.e. when the pressure in the tank 27 is lower than a standard set pressure), the first switching valve 14 is switched from the supply position (g) to the delivery position (h), and the front switching valve 6, the rear supply-discharge valves 10, the exhaust valve 23, and the bypass valve 25 are held in the closed positions (d), (f), (l), and (n), respectively. Then, the compressor 17 is activated to operate (i.e. to perform a compression operation) by the electric motor 18.

Consequently, the compressor 17 sucks the outside air into the interior of the compressor 17 through the suction port 21A, filter 21B and check valve 21C in the suction line 21 and the main line 16, pressurizes (compresses) the sucked air, and discharges compressed air toward the air dryer 19. Compressed air discharged from the compressor 17 is dried by the air dryer 19 before being stored in the tank 27 through the speed control valve 20, the front second vent line 13A, the front first vent line 12A, the front supply-discharge line 4, and the tank line 26. When the pressure in the tank 27 reaches a predetermined set pressure, for example, the compressor 17 is stopped. Thus, a sufficient amount of compressed air can be filled and reserved in the tank 58.

Figure 4:
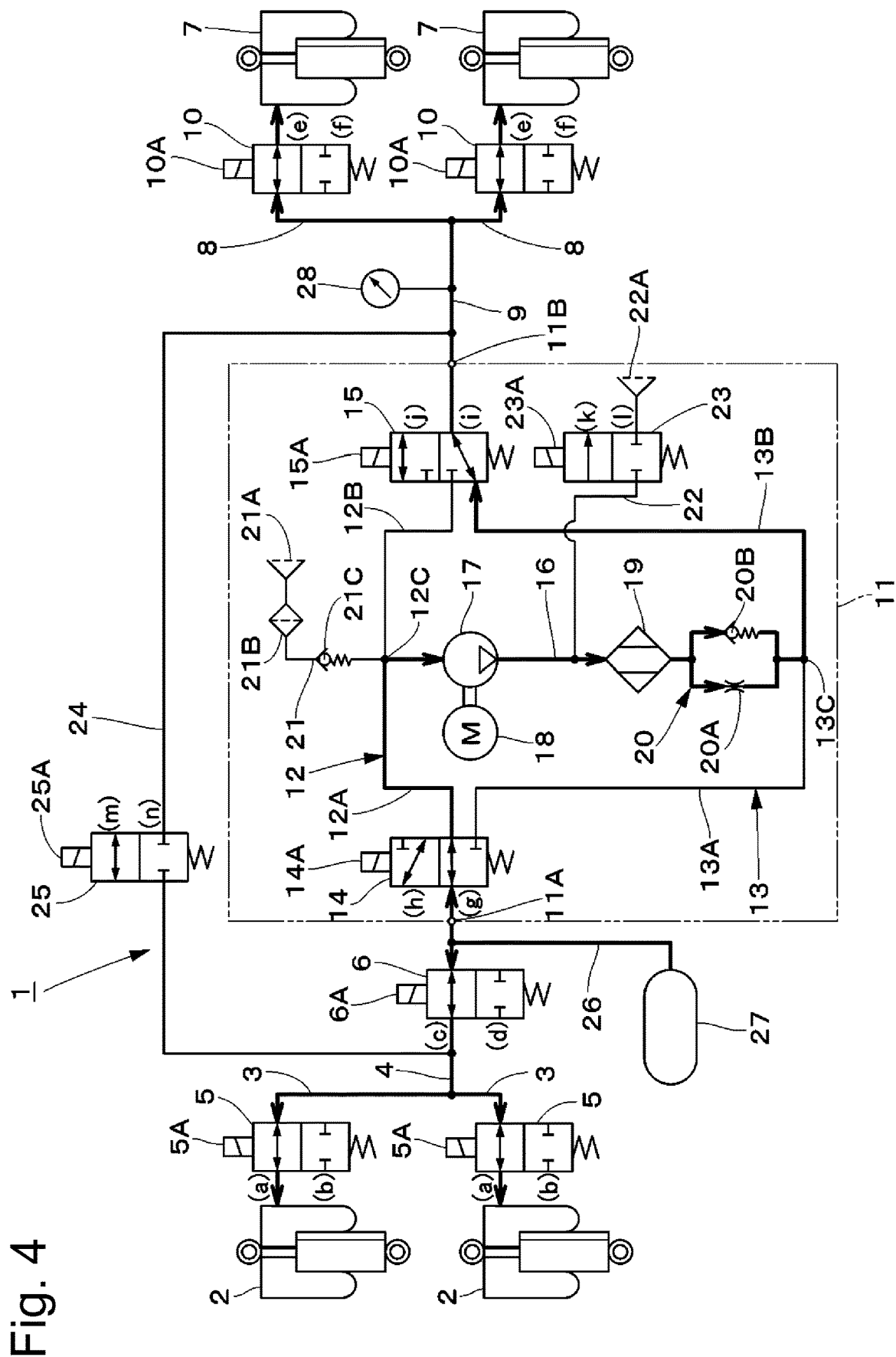
FIG. 4 is a circuit diagram showing the flow of compressed air when the front wheel-side vehicle height and the rear wheel-side vehicle height are to be raised simultaneously with each other.

Next, when the front wheel-side vehicle height and the rear wheel-side vehicle height are to be raised simultaneously with each other by the air suspensions 2 and 7, as shown in FIG. 4, the front supply-discharge valves 5 and the front switching valve 6 are switched from the closed positions (b) and (d) to the open positions (a) and (c), respectively. Consequently, the front wheel-side air suspensions 2 and the tank 27 are communicated with each other, and compressed air in the tank 27 is supplied to the front wheel-side air suspensions 2 through the front supply-discharge line 4 and the front branch lines 3.

Meanwhile, the rear supply-discharge valves 10 are switched from the closed position (f) to the open position (e), and the first switching valve 14 and the second switching valve 15 are held in the supply positions (g) and (i), respectively, thereby providing communication between the tank 27 and the suction side of the compressor 17 and between the discharge side of the compressor 17 and the rear wheel-side air suspensions 7. In this state, the compressor 17 is activated to operate, thereby allowing compressed air in the tank 27 to flow out to the suction side of the compressor 17 through the front supply-discharge line 4, the front first vent line 12A, and the main line 16. Thus, the compressed air in the tank 27 is pressurized by the compressor 17, and the pressurized compressed air is supplied to the rear wheel-side air suspensions 7 through the main line 16, the rear second vent line 13B, the rear first vent line 12B, the rear supply-discharge line 9, and the rear branch lines 8.

In this case, the compressor 17 separates from each other the flow of compressed air from the tank 27 toward the front wheel-side air suspensions 2 and the flow of compressed air from the tank 27 toward the rear wheel-side air suspensions 7. Thus, the pressure of compressed air flowing toward the front wheel-side air suspensions 2 and the pressure of compressed air flowing toward the rear wheel-side air suspensions 7 are allowed to differ from each other, and the pressure in the front wheel-side air suspensions 2 and the pressure in the rear wheel-side air suspensions 7 are prevented from affecting each other. That is, the compressed air flowing toward the rear wheel-side air suspensions 7 passes through the compressor 17 and is therefore higher in pressure than the compressed air flowing toward the front wheel-side air suspensions 2. It should be noted that when the front and rear vehicle heights are to be raised simultaneously with each other, the pressure of compressed air in the tank 27 should preferably be set sufficiently high in advance in order to prevent the compressor 17 from sucking air from the front wheel-side air suspensions 2.

When only the front wheel-side vehicle height is to be raised by compressed air in the tank 27, the front supply-discharge valves 5 and the front switching valve 6 are switched to the open positions (a) and (c), respectively, and the rear supply-discharge valves 10 and the bypass valve 25 are held in the closed positions (f) and (n), respectively. By so doing, compressed air in the tank 27 can be supplied only to the front wheel-side air suspensions 2 through the front supply-discharge line 4 and the front branch lines 3.

Figure 5:
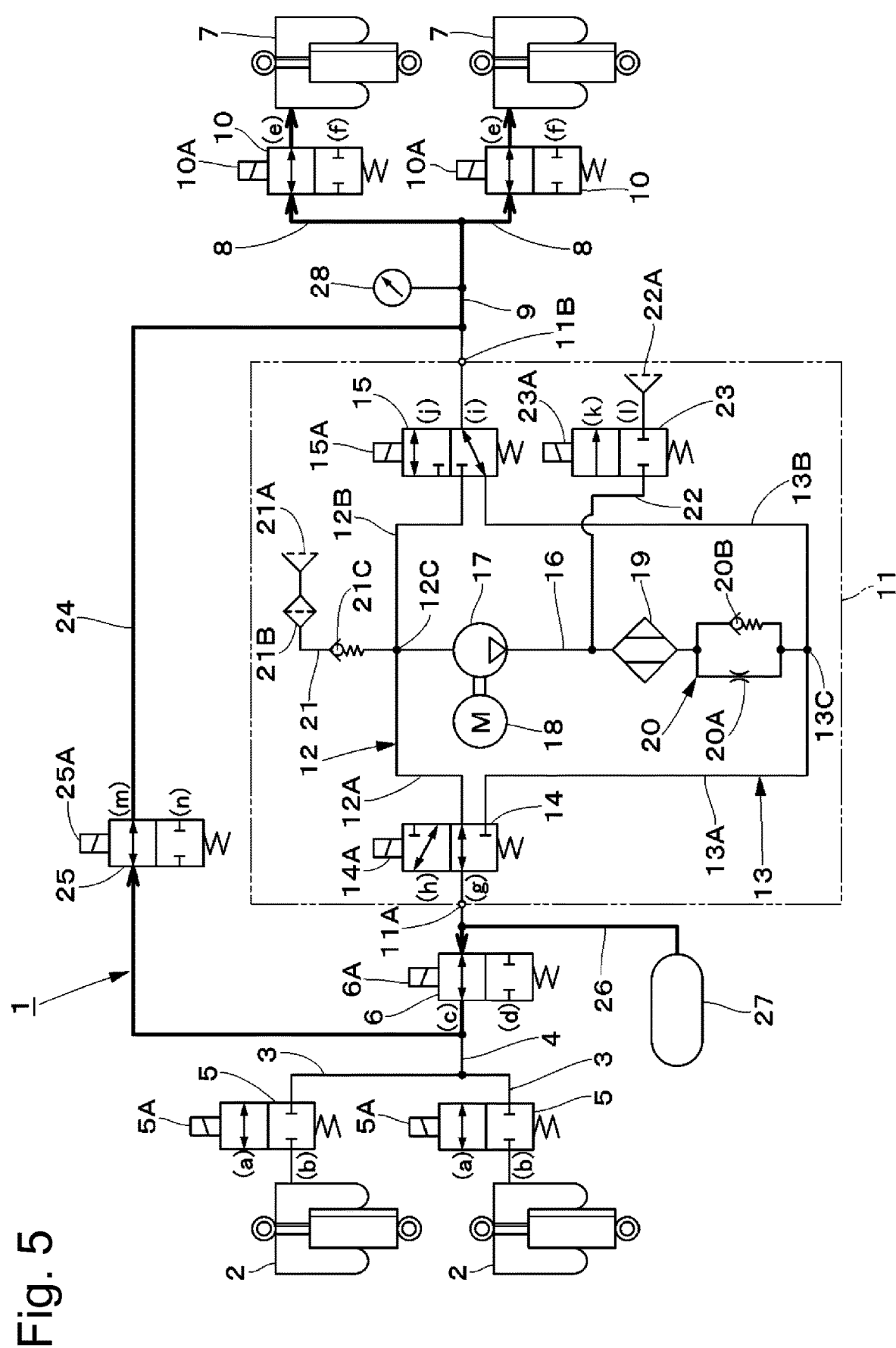
FIG. 5 is a circuit diagram showing the flow of compressed air when the rear wheel-side vehicle height is to be raised without using the compression unit.

On the other hand, when only the rear wheel-side vehicle height is to be raised by compressed air in the tank 27, as shown in FIG. 5, the front switching valve 6, the rear supply-discharge valves 10, and the bypass valve 25 are switched to the open positions (c), (e), and (m), respectively, and the front supply-discharge valves 5 are held in the closed position (b). In addition, the first switching valve 14 and the second switching valve 15 are held in the supply positions (g) and (i), respectively. Thus, the compressed air in the tank 27 can be supplied only to the rear wheel-side air suspensions 7 through the front supply-discharge line 4, the bypass line 24, the rear supply-discharge line 9, and the rear branch lines 8.

After completion of the vehicle height raising operation, the front supply-discharge valves 5 and the rear supply-discharge valves 10 are switched to the closed positions (b) and (f) to close the front branch lines 3 and the rear branch lines 8, respectively. Thus, the flow of compressed air to the air suspensions 2 and 7 is cut off to keep the air suspensions 2 and 7 in the extended positions, thereby allowing the vehicle height to be maintained in the raised position.

Figure 6:
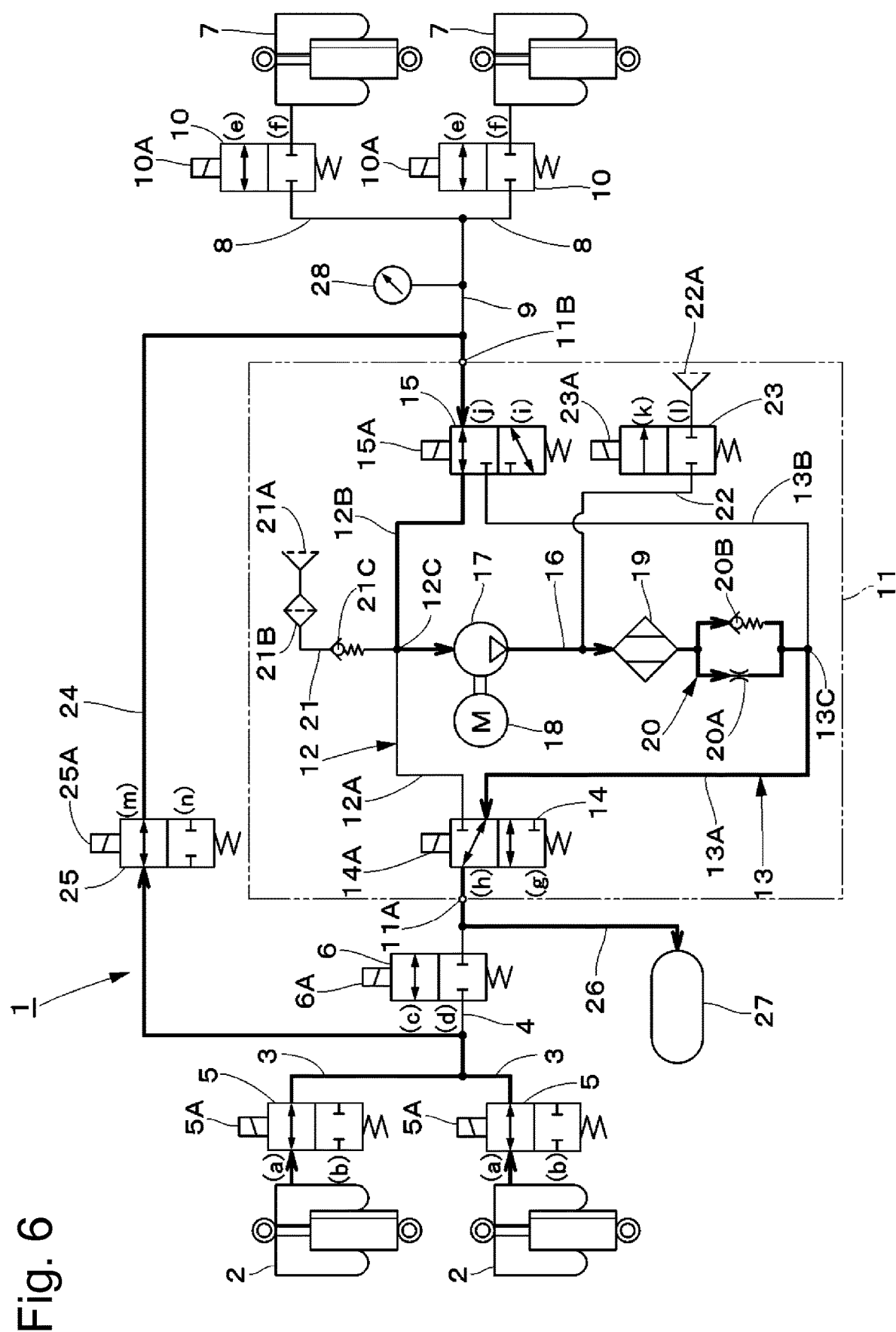
FIG. 6 is a circuit diagram showing the flow of compressed air when the front wheel-side vehicle height is to be lowered.

Next, when only the front wheel-side vehicle height is to be lowered, as shown in FIG. 6, the front supply-discharge valves 5 and the bypass valve 25 are switched to the open positions (a) and (m), respectively, and the front switching valve 6 and the rear supply-discharge valves 10 are held in the closed positions (d) and (f), respectively. In addition, the first switching valve 14 and the second switching valve 15 are switched from the supply positions (g) and (i) to the delivery positions (h) and (j), respectively. In this state, the compressor 17 is started to operate. Consequently, compressed air in the front wheel-side air suspensions 2 flows toward the suction side of the compressor 17 through the front branch lines 3, the front supply-discharge line 4, the bypass line 24, the rear supply-discharge line 9, the rear first vent line 12B, and the main line 16. The compressor 17 pressurizes the compressed air from the front wheel-side air suspensions 2 and supplies the pressurized compressed air to the tank 27 through the main line 16, the front second vent line 13A, the front first vent line 12A, the front supply-discharge line 4, and the tank line 26. As a result, compressed air is discharged from the front wheel-side air suspensions 2, and thus the front wheel-side air suspensions 2 shift to a contracted state, thereby enabling the vehicle height to be lowered.

Figure 7:
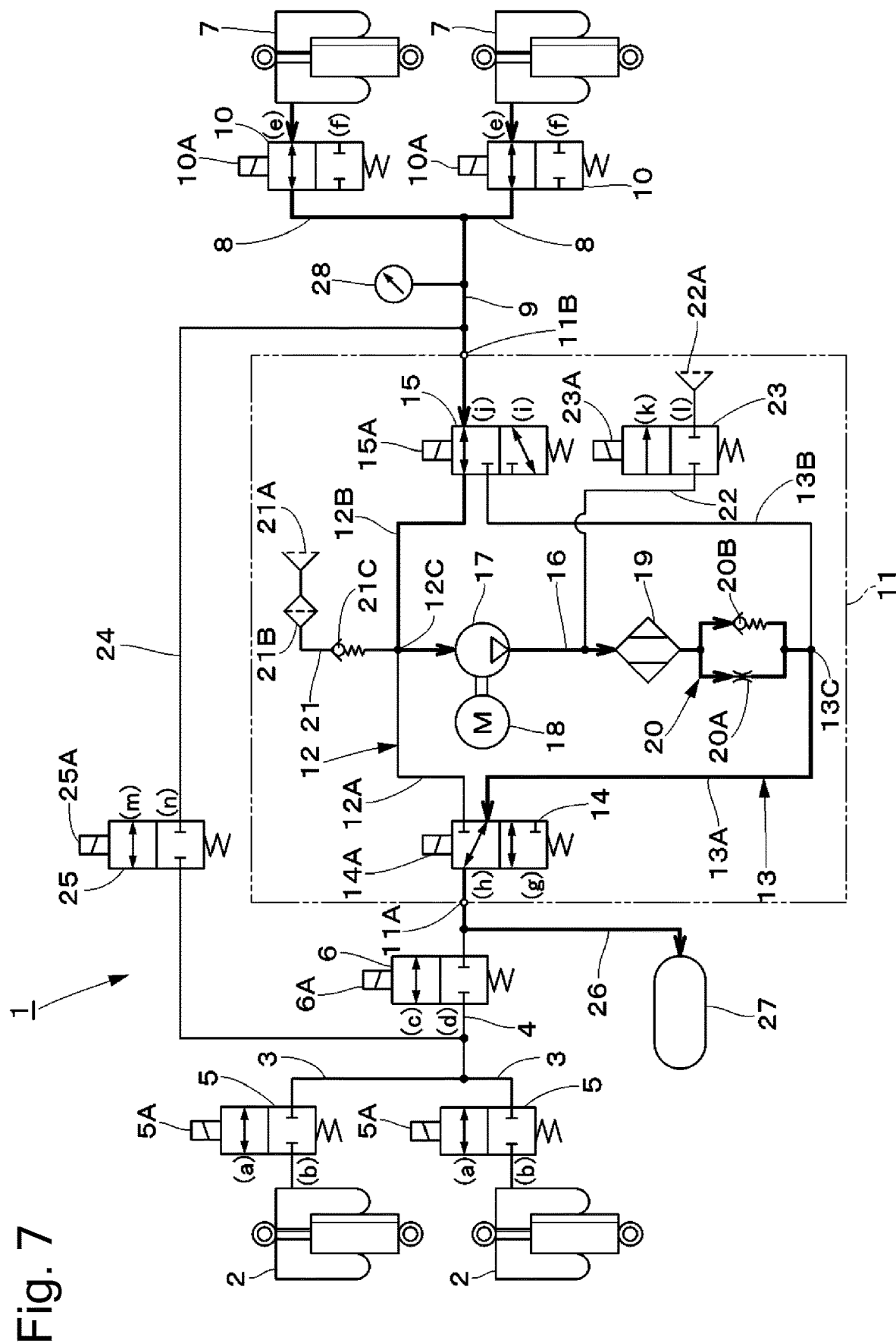
FIG. 7 is a circuit diagram showing the flow of compressed air when the rear wheel-side vehicle height is to be lowered.

On the other hand, when only the rear wheel-side vehicle height is to be lowered, as shown in FIG. 7, the rear supply-discharge valves 10 are switched to the open position (e), and the front supply-discharge valves 5, the front switching valve 6, and the bypass valve 25 are held in the closed positions (b), (d), and (n), respectively. In addition, the first switching valve 14 and the second switching valve 15 are switched from the supply positions (g) and (i) to the delivery positions (h) and (j), respectively. In this state, the compressor 17 is started to operate. Consequently, compressed air in the rear wheel-side air suspensions 7 flows toward the suction side of the compressor 17 through the rear branch lines 8, the rear supply-discharge line 9, the rear first vent line 12B, and the main line 16. The compressor 17 pressurizes the compressed air from the rear wheel-side air suspensions 7 and supplies the pressurized compressed air to the tank 27 through the main line 16, the front second vent line 13A, the front first vent line 12A, the front supply-discharge line 4, and the tank line 26. As a result, compressed air is discharged from the rear wheel-side air suspensions 7, and thus the rear wheel-side air suspensions 7 shift to a contracted state, thereby enabling the vehicle height to be lowered.

It should be noted that the system may be configured such that when the vehicle height is to be lowered and the pressure in the tank 27 is lower than the pressure in the air suspensions 2 and 7, compressed air from the air suspensions 2 and 7 flows directly to the tank 27 without passing via the compressor 17.

Next, when compressed air in the tank 27 is to be discharged to the outside, the front switching valve 6, the rear supply-discharge valves 10, and the bypass valve 25 are held in the closed positions (d), (f), and (n), respectively, and the exhaust valve 23 is switched to the open position (k). In addition, the first switching valve 14 is held in the delivery position (h). Thus, compressed air in the tank 27 can be discharged directly to the outside from the exhaust port 22A through the tank line 26, the front supply-discharge line 4, the front first vent line 12A, the front second vent line 13A, the main line 16, the restriction 20A of the speed control valve 20, the air dryer 19, and the exhaust line 22. In this case, compressed air discharged from the tank 27 flows toward the exhaust line 22 through the air dryer 19. Therefore, it is possible to remove water from the desiccant filled in the air dryer 19 and to regenerate the desiccant.

Thus, the air suspension system 1 according to the first embodiment is configured such that when the vehicle height is to be raised by the air suspensions 2 and 7, the front wheel-side air suspensions 2 are supplied with compressed air from the tank 27, and the rear wheel-side air suspensions 7 are supplied with compressed air from the tank 27 after the compressed air has been pressurized by the compressor 17. With this structure, the vehicle front wheel side and the vehicle rear wheel side can be raised simultaneously with each other with a single tank 27. As a result, the number of tanks 27 can be minimized, and it is therefore possible to reduce the installation space in the vehicle and the vehicle weight and also possible to reduce the number of components such as tank valves, pressure sensors, and so forth. It should be noted that the vehicle front wheel side and the vehicle rear wheel side may be raised individually of each other.

Further, because the air suspensions 2 and 7 can be respectively supplied with compressed air from the tank 27 and compressed air pressurized by the compressor 17, the front wheel-side vehicle height and the rear wheel-side vehicle height can be raised simultaneously with each other. As a result, the vehicle height raising time can be shortened as compared to a structure in which the front wheel-side vehicle height and the rear wheel-side vehicle height are alternately raised.

In this case, the flow of compressed air from the tank 27 toward the front wheel-side air suspensions 2 and the flow of compressed air from the tank 27 toward the rear wheel-side air suspensions 7 are separated from each other by using the compressor 17. Thus, the pressure of compressed air flowing toward the front wheel-side air suspensions 2 and the pressure of compressed air flowing toward the rear wheel-side air suspensions 7 are allowed to differ from each other, and the pressure in the front wheel-side air suspensions 2 and the pressure in the rear wheel-side air suspensions 7 are prevented from affecting each other. Consequently, the pressure in the front wheel-side air suspensions 2 and the pressure in the rear wheel-side air suspensions 7 cannot affect each other even when these pressures are different from each other. Therefore, it is possible to suppress a flow of compressed air from the air suspensions of higher pressure to the air suspensions of lower pressure.

Accordingly, it is possible to stabilize behavior of the vehicle during raising the vehicle height. That is, it is possible to reduce tilting during a vehicle height raising operation. Therefore, the angle of the headlights is unlikely to change during running of the vehicle, and at the same time, it is possible to improve the appearance performance of the vehicle.

Further, the first embodiment is configured such that the front wheel-side air suspensions 2 are supplied with compressed air from the tank 27, and the rear wheel-side air suspensions 7 are supplied with compressed air from tank 27 after the compressed air has been pressurized by the compressor 17. With this structure, the pressure of compressed air supplied to the rear wheel-side air suspensions 7 can be made higher than the pressure of compressed air supplied to the front wheel-side air suspensions 2.

Further, the air suspension system 1 constitutes a closed circuit (closed system) capable of storing the tank 27 with compressed air compressed by the compressor 17 and of supplying the air suspensions 2 and 7 with the compressed air stored in the tank 27. With this structure, the air suspension system 1 is unlikely to be affected by the outside temperature, humidity, pressure, etc. and hence capable of performing stable suspension control.

Figure 8:
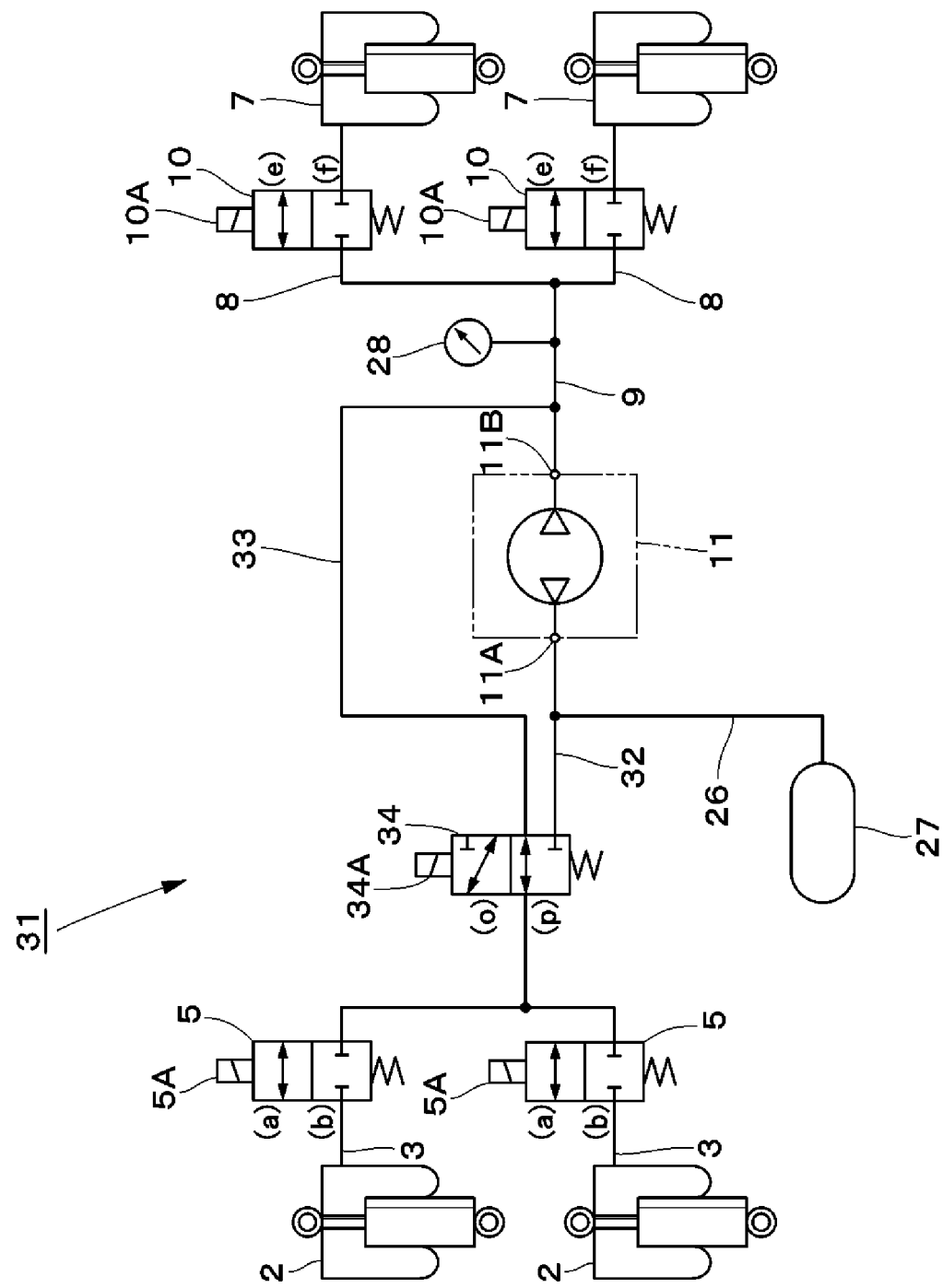
FIG. 8 is a circuit diagram showing an overall structure of an air suspension system according to a second embodiment.

Next, FIG. 8 shows a second embodiment of the present invention. The feature of the second embodiment resides in that the front switching valve is connected to the front supply-discharge line and the bypass line. It should be noted that in the second embodiment the same constituent elements as those of the foregoing first embodiment are denoted by the same reference signs as used in the first embodiment, and a description thereof is omitted.

In FIG. 8, a vehicle-mounted air suspension system 31 is constructed by including front wheel-side air suspensions 2, rear wheel-side air suspensions 7, a compression unit 11, a tank 27, and a controller 30 in the same way as the air suspension system 1 of the first embodiment. However, the air suspension system 31 of the second embodiment differs from the air suspension system 1 of the first embodiment in that a front switching valve 34 (described later) is connected to front branch lines 3, a front supply-discharge line 32, and a bypass line 33.

The front supply-discharge line 32 is provided between the compression unit 11 and the front switching valve 34. Specifically, the front supply-discharge line 32 is connected at one end thereof to the front switching valve 34 and connected at the other end thereof to the front connection point 11A of the compression unit 11. A tank line 26 is provided halfway in the front supply-discharge line 32.

The bypass line 33 is provided across the compression unit 11. Specifically, the bypass line 33 is connected at one end thereof to the front branch lines 3 and connected at the other end thereof to the rear supply-discharge line 9. The bypass line 33 bypasses the compression unit 11 and delivers compressed air from the front branch lines 3 straight to the rear supply-discharge line 9 or from the rear supply-discharge line 9 straight to the front branch lines 3. A front switching valve 34 is provided halfway in the bypass line 33.

The front switching valve 34 is provided in the bypass line 33 between the front supply-discharge valves 5 and the compression unit 11. The front switching valve 34 comprises, for example, a 3-port, 2-position electromagnetic direction switching valve having a solenoid 34A for selectively connecting the other end of the bypass line 33 to the front supply-discharge line 32 or the rear supply-discharge line 9, and is switching-controlled by the controller 30.

The front switching valve 34 is selectively switched in response to an electric current supplied to the solenoid 34A from the controller 30 between a supply position (o) where the front switching valve 34 allows compressed air in the tank 27 to be supplied to and discharged from the front wheel-side air suspensions 2 through the front supply-discharge line 32, the bypass line 33, and the front branch lines 3, and a delivery position (p) where the front switching valve 34 allows compressed air in the front wheel-side air suspensions 2 to be supplied (delivered) into the tank 27 through the front branch lines 3, the rear supply-discharge line 9, the compression unit 11, the front supply-discharge line 32, and the tank line 26. In other words, the front switching valve 34 constitutes a front wheel-side switching section switching the communication state between the front wheel-side air suspensions 2 and the tank 27.

Thus, the second embodiment can provide substantially the same advantages as those of the first embodiment. In the second embodiment, the front wheel-side switching section for switching the communication state between the front wheel-side air suspensions 2 and the tank 27 is constructed by using a 3-port, 2-position front switching valve 34. Thus, it is possible to selectively provide or cut off communication between the front wheel-side air suspensions 2 and the tank 27 or between the front wheel-side air suspensions 2 and the rear supply-discharge line 9 by using a single front switching valve 34. Consequently, it is unnecessary to provide an electromagnetic valve in each of the front supply-discharge line 32 and the bypass line 33, and the number of electromagnetic valves can be reduced. Therefore, it is possible to suppress the cost of components.

Figure 9:
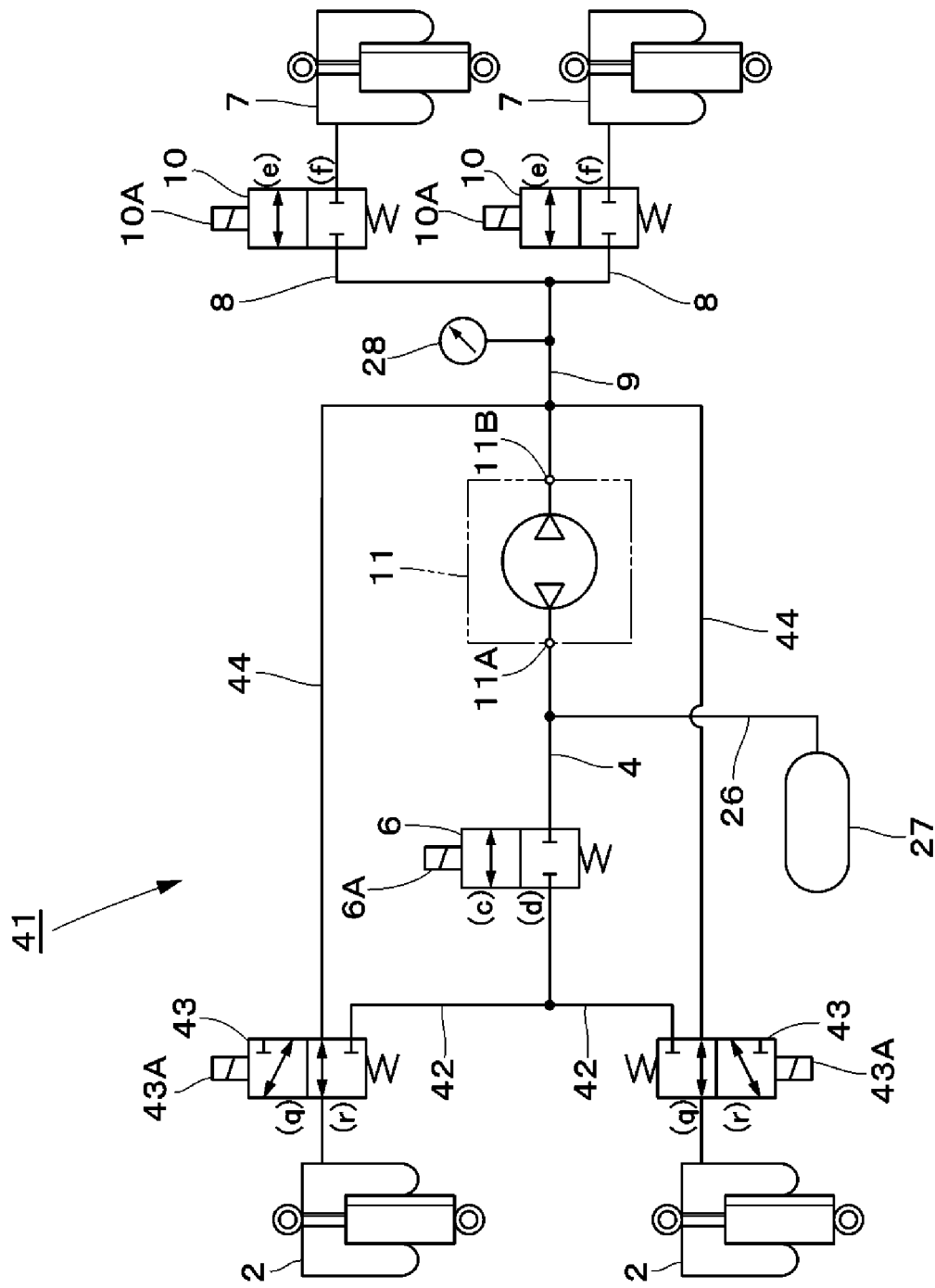
FIG. 9 is a circuit diagram showing an overall structure of an air suspension system according to a third embodiment.

Next, FIG. 9 shows a third embodiment of the present invention. The feature of the third embodiment resides in that the front supply-discharge valves are connected to the front branch lines and bypass lines, respectively. It should be noted that in the third embodiment the same constituent elements as those of the foregoing first embodiment are denoted by the same reference signs as used in the first embodiment, and a description thereof is omitted.

In FIG. 9, a vehicle-mounted air suspension system 41 is constructed by including front wheel-side air suspensions 2, rear wheel-side air suspensions 7, a compression unit 11, a tank 27, and a controller 30 in the same way as the air suspension system 1 of the first embodiment. However, the air suspension system 41 of the third embodiment differs from the air suspension system 1 of the first embodiment in that front supply-discharge valves 43 (described later) are connected to front branch lines 42 and bypass lines 44, respectively.

The front branch lines 42 are provided between the associated front wheel-side air suspensions 2 and the front supply-discharge line 4. Specifically, the front branch lines 42 are connected at one end thereof to the left and right front wheel-side air suspensions 2, respectively, and connected at the other end thereof to the front supply-discharge line 4. A front supply-discharge valve 43 is provided halfway in each front branch line 42.

The front supply-discharge valves 43 are provided in the front branch lines 42, respectively, between the associated front wheel-side air suspensions 2 and the front switching valve 6. Each front supply-discharge valve 43 comprises, for example, a 3-port, 2-position electromagnetic direction switching valve having a solenoid 43A for selectively connecting the other end of the associated front branch line 42 to the front supply-discharge line 4 or the associated bypass line 44, and is switching-controlled by the controller 30.

The front supply-discharge valves 43 are each selectively switched in response to an electric current supplied to the solenoid 43A from the controller 30 between a supply position (q) where the front supply-discharge valve 43 allows compressed air in the tank 27 to be supplied to and discharged from the associated front wheel-side air suspension 2 through the front supply-discharge line 4 and the associated front branch line 42, and a delivery position (r) where the front supply-discharge valve 43 allows compressed air in the associated front wheel-side air suspension 2 to be supplied (delivered) into the tank 27 through the associated front branch line 42, the associated bypass line 44, the rear supply-discharge line 9, the compression unit 11, the front supply-discharge line 4, and the tank line 26. In other words, each front supply-discharge valve 43 constitutes a front wheel-side switching section switching the communication state between the associated front wheel-side air suspension 2 and the tank 27.

There are two bypass lines 44 provided across the compression unit 11. Specifically, each bypass line 44 is connected at one end thereof to the associated one of the left and right front branch lines 42 and connected at the other end thereof to the rear supply-discharge line 9. The bypass lines 44 bypass the compression unit 11 and deliver compressed air from the front branch lines 42 straight to the rear supply-discharge line 9 or from the rear supply-discharge line 9 straight to the front branch lines 42.

Thus, the third embodiment can provide substantially the same advantages as those of the first embodiment. In the third embodiment, the front wheel-side switching section for switching the communication state between each front wheel-side air suspension 2 and the tank 27 is constructed by using a 3-port, 2-position front supply-discharge valve 43. Thus, it is possible to selectively provide or cut off communication between each front wheel-side air suspension 2 and the tank 27 or between the front wheel-side air suspension 2 and the rear supply-discharge line 9 by using a single front supply-discharge valve 43. Consequently, it is unnecessary to provide an electromagnetic valve in each of the front branch lines 42 and bypass lines 44, and the number of electromagnetic valves can be reduced. Therefore, it is possible to suppress the cost of components.

Figure 10:
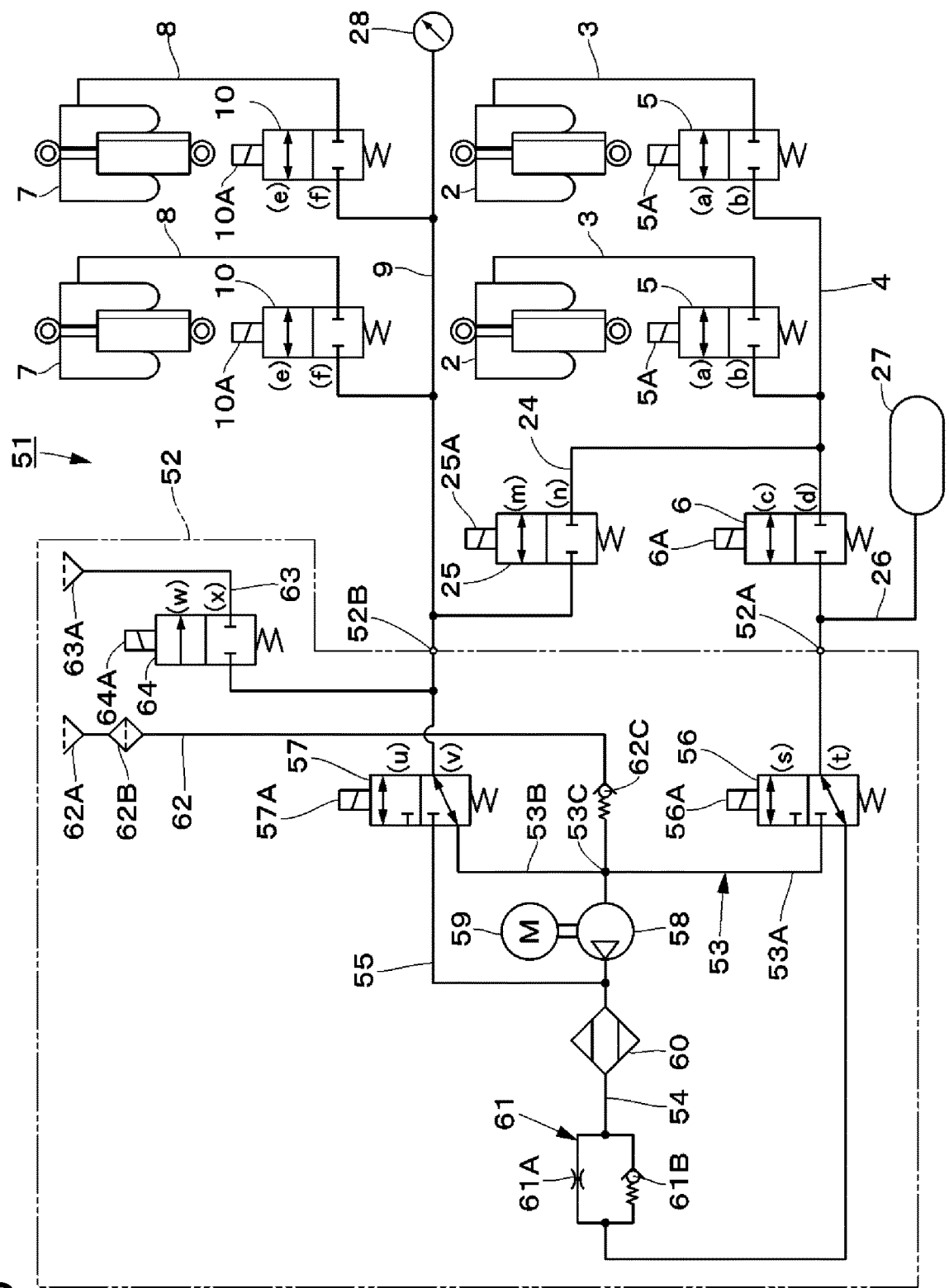
FIG. 10 is a circuit diagram showing an overall structure of an air suspension system according to a fourth embodiment.

Next, FIG. 10 shows a fourth embodiment of the present invention. The feature of the fourth embodiment resides in that the compression unit has a circuit configuration different from that of the compression unit in the first embodiment. It should be noted that in the fourth embodiment the same constituent elements as those of the foregoing first embodiment are denoted by the same reference signs as used in the first embodiment, and a description thereof is omitted.

In FIG. 10, a vehicle-mounted air suspension system 51 is constructed by including front wheel-side air suspensions 2, rear wheel-side air suspensions 7, a compression unit 52, a tank 27, and a controller 30 in the same way as the air suspension system 1 of the first embodiment. However, the air suspension system 51 of the fourth embodiment differs from the air suspension system 1 of the first embodiment in that the compression unit 52 has a circuit configuration modified from that of the compression unit 11 in the first embodiment.

The compression unit 52 is connected between the front wheel-side air suspensions 2 and the rear wheel-side air suspensions 7. Specifically, the compression unit 52 is connected at one end thereof to the front supply-discharge line 4 through a front connection point 52A and connected at the other end thereof to the rear supply-discharge line 9 through a rear connection point 52B. The compression unit 52 is, as shown in FIG. 10, constructed by including a vent line 53, a main line 54, a supply-discharge line 55, first and second switching valves 56 and 57, a compressor 58, an electric motor 59, an air dryer 60, a speed control valve 61, a suction line 62, an exhaust line 63, and so forth. The compression unit 52 constitutes a compressed air source supplying compressed air to the front wheel-side air suspensions 2 and the rear wheel-side air suspensions 7.

The vent line 53 is connected at one end thereof to the front supply-discharge line 4 through the front connection point 52A and connected at the other end thereof to the rear supply-discharge line 9 through the rear connection point 52B. The vent line 53 connects between the front supply-discharge line 4 and the rear supply-discharge line 9 across the suction side of the compressor 58. In this case, the vent line 53 comprises a front vent line 53A connecting between the front connection point 52A and a connection point 53C of a main line 54 (described later), and a rear vent line 53B connecting between the connection point 53C of the main line 54 and the rear connection point 52B.

The front vent line 53A is provided with a first switching valve 56 (described later). The front vent line 53A constitutes a vent passage leading compressed air from the tank 27 to the suction side of the compressor 58 when the rear wheel-side air suspensions 7 and the compressor 58 are communicated with each other. The rear vent line 53B is provided with a second switching valve 57 (described later).

The main line 54 connects between the vent line 53 and the first switching valve 56. That is, one end at the upstream side of the main line 54 is connected to the connection point 53C (between the front vent line 53A and the rear vent line 53B) of the vent line 53, and the other end at the downstream side of the main line 54 is connected to the first switching valve 56. The main line 54 constitutes a supply-discharge line performing supply and discharge of compressed air to and from the air suspensions 2 and 7. The main line 54 is provided with a compressor 58, an air dryer 60, and a speed control valve 61.

The supply-discharge line 55 is provided between the main line 54 and the second switching valve 57. Specifically, the supply-discharge line 55 is connected at one end thereof to the main line 54 and connected at the other end thereof to the second switching valve 57. The supply-discharge line 55 connects between the discharge side of the compressor 58 and the second switching valve 57.

The first switching valve 56 is provided at one end side of the front vent line 53A between the front switching valve 6 and the suction side of the compressor 58. The first switching valve 56 comprises, for example, a 3-port, 2-position electromagnetic direction switching valve having a solenoid 56A for selectively connecting the front supply-discharge line 4 to the suction side (vent line 53) of the compressor 58 or the discharge side (main line 54) of the compressor 58, and is switching-controlled by the controller 30.

The first switching valve 56 is selectively switched in response to an electric current supplied to the solenoid 56A from the controller 30 between a supply position (s) where the first switching valve 56 allows compressed air in the tank 27 to be supplied to and discharged from the rear wheel-side air suspensions 7 through the front vent line 53A, the main line 54, and the supply-discharge line 55, and a delivery position (t) where the first switching valve 56 allows compressed air in the air suspensions 2 and 7 to be supplied (delivered) into the tank 27 through the main line 54 and the front vent line 53A. That is, the first switching valve 56 constitutes a switching mechanism changing the flow direction of compressed air.

The second switching valve 57 is provided at the other end side of the rear vent line 53B between the rear supply-discharge valves 10 and the suction side of the compressor 58. The second switching valve 57 comprises, for example, a 3-port, 2-position electromagnetic direction switching valve having a solenoid 57A for selectively connecting the vent line 53 or the supply-discharge line 55 to the rear supply-discharge line 9, and is switching-controlled by the controller 30.

The second switching valve 57 is selectively switched in response to an electric current supplied to the solenoid 57A from the controller 30 between a supply position (u) where the second switching valve 57 allows compressed air in the tank 27 to be supplied to and discharged from the rear wheel-side air suspensions 7 through the front vent line 53A, the main line 54, and the supply-discharge line 55, and a delivery position (v) where the second switching valve 57 allows compressed air in the air suspensions 2 and 7 to be supplied (delivered) into the tank 27 through the rear vent line 53B, the main line 54 and the front supply-discharge line 4. That is, the second switching valve 57 constitute a rear wheel-side switching section switching the communication state between the rear wheel-side air suspensions 7 and the compression unit 52 by changing the flow direction of compressed air.

The compressor 58 is provided in the main line 54. The compressor 58 comprises, for example, a reciprocating compressor or a scroll compressor. The compressor 58 is driven by an electric motor 59 as a drive source to compress air sucked in from the vent line 53 side or from the suction line 62 side to thereby generate compressed air and supplies the compressed air to the air dryer 60.

The air dryer 60 is provided in the main line 54 between the compressor 58 and the speed control valve 61. The air dryer 60 contains a water adsorbent or the like. When compressed air supplied from the compressor 58 flows through the air dryer 60 in a forward direction toward the speed control valve 61, the air dryer 60 adsorbs water from the compressed air by the water adsorbent contained therein. On the other hand, compressed air flowing in a backward direction from the air suspensions 2 and 7 or the tank 27 toward an exhaust line 63 (described later) desorbs water from the water adsorbent by flowing backward through the air dryer 60, thereby regenerating the water adsorbent.

The speed control valve 61 is provided in the main line 54 between the air dryer 60 and the first switching valve 56. The speed control valve 61 comprises a parallel circuit of a restriction 61A and a check valve 61B. The speed control valve 61 is configured as follows. For the forward flow of compressed air, the check valve 61B opens, so that the flow rate of compressed air is not reduced. For the backward flow of compressed air, however, the check valve 61B closes, and at this time, the flow rate of compressed air is reduced by the restriction 61A. Consequently, compressed air slowly flows backward through the air dryer 60 at a reduced flow rate.

The suction line 62 is provided upstream of the suction side of the compressor 58. Specifically, the suction line 62 is communicated at one end thereof with the outside through a suction port 62A and connected at the other end thereof to the vent line 53. The suction line 62 supplies outside air or atmospheric air sucked in from the suction port 62A to the compressor 58 through a filter 62B when the compressor 58 operates. The suction line 62 is provided with a check valve 62C preventing backflow of air sucked in from the suction port 62A.

The exhaust line 63 is provided between the rear connection point 52B and the second switching valve 57. Specifically, the exhaust line 63 is connected at one end thereof to the rear vent line 53B and communicated at the other end thereof with the outside through an exhaust port 63A. The exhaust line 63 is a line for discharging compressed air from the air suspensions 2 and 7 and the tank 27 into the outside atmospheric air. An exhaust valve 64 is provided halfway in the exhaust line 63.

The exhaust valve 64 is a valve that selectively provides or cuts off communication between the exhaust line 63, which is connected to the main line 54, and the atmosphere. The exhaust valve 64 comprises a 2-port, 2-position electromagnetic valve having a solenoid 64A and is switching-controlled by the controller 30. The exhaust valve 64 is selectively switched in response to an electric current supplied to the solenoid 64A from the controller 30 between an open position (w) where the exhaust valve 64 opens the exhaust line 63 to allow discharge of compressed air from the exhaust port 63A, and a closed position (x) where the exhaust valve 64 closes the exhaust line 63 to block the discharge of compressed air from the exhaust port 63A. That is, the exhaust valve 64 is normally closed to cut off the exhaust line 63 from the exhaust port 63A. When opened, the exhaust valve 64 allows the exhaust line 63 to communicate with the exhaust port 63A, thereby discharging (releasing) compressed air from the exhaust line 63 into the atmosphere.

Thus, the fourth embodiment can provide substantially the same advantages as those of the first embodiment. In the fourth embodiment, the first switching valve 56 is connected to the front vent line 53A and the main line 54. The second switching valve 57 is connected to the rear vent line 53B and the supply-discharge line 55. Accordingly, the vehicle front wheel side and the vehicle rear wheel side can be raised simultaneously with each other with a single tank 27. It should be noted that the vehicle front wheel side and the vehicle rear wheel side may be raised individually of each other. As a result, the number of tanks 27 can be minimized, and it is therefore possible to reduce the installation space in the vehicle and the vehicle weight and also possible to reduce the number of components such as tank valves, pressure sensors, and so forth.

Figure 11:
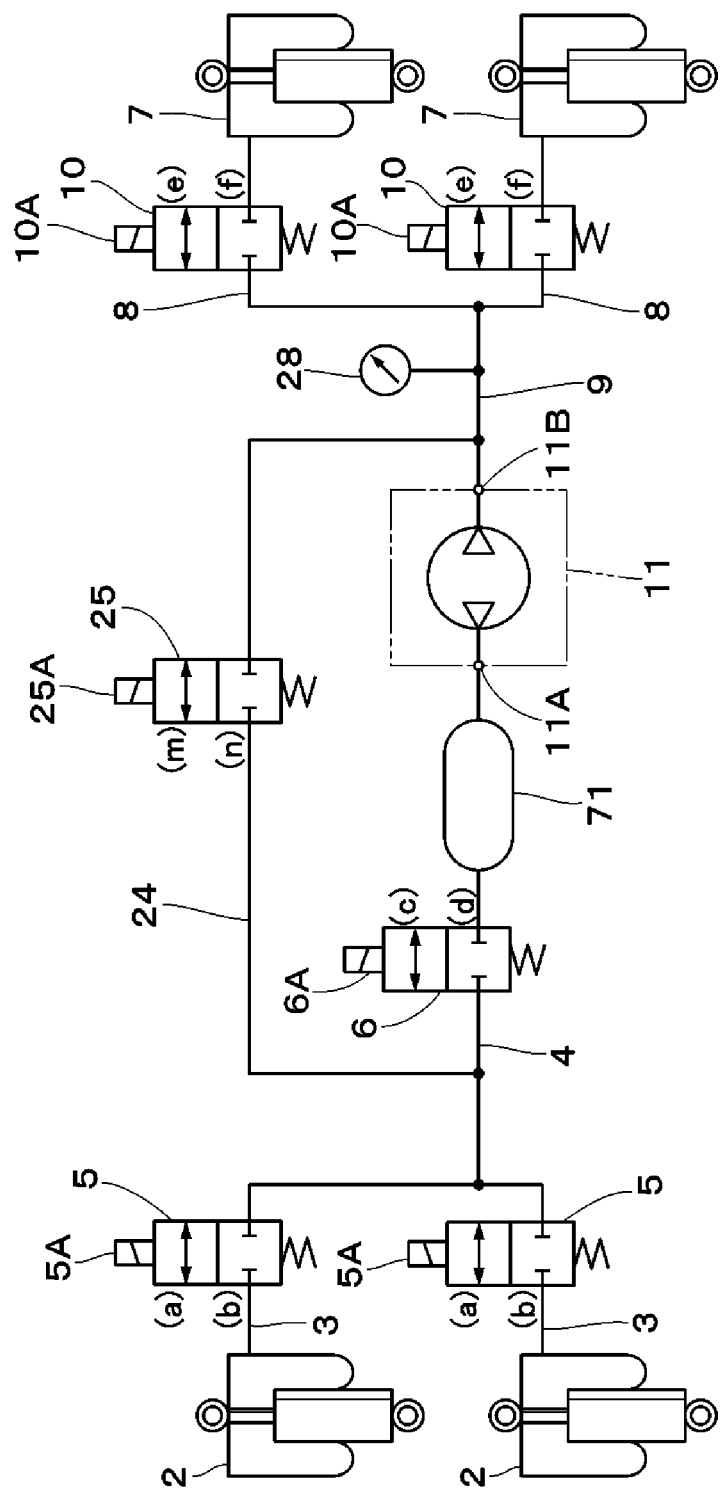
FIG. 11 is a circuit diagram showing an overall structure of an air suspension system according to a modification.

It should be noted that, in the foregoing first embodiment, the tank line 26 is led out from the tank 27 to supply compressed air from the tank 27 to the front wheel-side air suspensions 2 and the rear wheel-side air suspensions 7 through the tank line 26. The present invention, however, is not limited to the described structure but may be configured as shown by a modification in FIG. 11, for example. That is, the arrangement may be such that a tank 71 is provided halfway in the front supply-discharge line 4, and that compressed air flowing toward the front wheel-side air suspensions 2 and compressed air flowing toward the rear wheel-side air suspensions 7 are branched off from each other in the tank 71. The same shall apply to the second, third and fourth embodiments.

Further, in the first embodiment, the front wheel-side air suspensions 2 are supplied with compressed air from the tank 27, and the rear wheel-side air suspensions 7 are supplied with compressed air pressurized by using the compressor 17. The present invention, however, is not limited to the described structure but may be configured as follows. The front wheel-side air suspensions are supplied with compressed air pressurized by using the compressor, and the rear wheel-side air suspensions are supplied with compressed air from the tank. The same shall apply to the second, third and fourth embodiments.

Further, in the second embodiment, the air suspension system 31 is configured to have the compression unit 11. The present invention, however, is not limited to the described structure. The air suspension system 31 may be configured to have the compression unit 52 in the fourth embodiment in place of the compression unit 11. The same shall apply to the third embodiment.

Further, in the first embodiment, the compression unit 11 is configured to have one compressor 17. The present invention, however, is not limited to the described structure. The compression unit may be configured to have two or more compressors. The same shall apply to the second, third and fourth embodiments.

The following is a description of inventions included in the foregoing embodiments. According to the present invention, the air suspension system further includes a front wheel-side switching section switching the communication state between the front wheel-side air suspension and the tank, a rear wheel-side switching section switching the communication state between the rear wheel-side air suspension and the compressor, a vent passage for leading compressed air stored in the tank to the suction side of the compressor, and a control unit controlling the supply and discharge of compressed air to and from the front wheel-side air suspension and the rear wheel-side air suspension by controlling the front wheel-side switching section and the rear wheel-side switching section. When the vehicle height is to be raised by the front wheel-side air suspension and the rear wheel-side air suspension, the front wheel-side switching section is switched to provide communication between the front wheel-side air suspension and the tank, thereby allowing compressed air in the tank to be supplied to the front wheel-side air suspension, and the rear wheel-side switching section is switched to provide communication between the rear wheel-side air suspension and the compressor through the vent passage, thereby allowing compressed air in the tank to be supplied to the rear wheel-side air suspension after the compressed air has been pressurized by the compressor. With this structure, the vehicle front wheel side and the vehicle rear wheel side can be raised simultaneously with each other with a single tank. Accordingly, the number of tanks can be minimized. It should be noted that the vehicle front wheel side and the vehicle rear wheel side may be raised individually of each other.

Examples of air suspension systems according to the foregoing embodiments include those of the following aspects.

According to a first aspect, an air suspension system includes a front wheel-side air suspension and a rear wheel-side air suspension which are interposed between a vehicle body and associated axles to perform vehicle height adjustment in response to supply and discharge of air, and further includes a compressor compressing air, and a tank storing air compressed by the compressor. When the vehicle height is to be raised by the air suspensions, either one of the front wheel-side air suspension and the rear wheel-side air suspension is supplied with compressed air from the tank, and the other of the front wheel-side air suspension and the rear wheel-side air suspension is supplied with compressed air from the tank after the compressed air has been pressurized by the compressor.

According to a second aspect, the air suspension system in the first aspect further includes a front wheel-side switching section switching the communication state between the front wheel-side air suspension and the tank, a rear wheel-side switching section switching the communication state between the rear wheel-side air suspension and the compressor, a vent passage for leading compressed air stored in the tank to the suction side of the compressor, and a control unit controlling the supply and discharge of compressed air to and from the front wheel-side air suspension and the rear wheel-side air suspension by controlling the front wheel-side switching section and the rear wheel-side switching section. When the vehicle height is to be raised by the front wheel-side air suspension and the rear wheel-side air suspension, the front wheel-side switching section is switched to provide communication between the front wheel-side air suspension and the tank, thereby allowing compressed air in the tank to be supplied to the front wheel-side air suspension, and the rear wheel-side switching section is switched to provide communication between the rear wheel-side air suspension and the compressor through the vent passage, thereby allowing compressed air in the tank to be supplied to the rear wheel-side air suspension after the compressed air has been pressurized by the compressor.

According to a third aspect, the air suspension system in the first or second aspect is configured to raise the front wheel-side vehicle height and the rear wheel-side vehicle height simultaneously with each other.

According to a fourth aspect, the front wheel-side switching section in the second aspect is a 3-port, 2-position valve.

Although only some exemplary embodiments of the present invention have been described above, those skilled in the art will readily appreciate that various changes or improvements can be made to the exemplary embodiments without materially departing from the novel teaching and advantages of the present invention. Accordingly, all such changes or improvements are intended to be included within the technical scope of the present invention. The foregoing embodiments may be combined at will.

The present application claims priority to Japanese Patent Application No. 2016-066028 filed on Mar. 29, 2016. The entire disclosure of Japanese Patent Application No. 2016-066028 filed on Mar. 29, 2016 including specification, claims, drawings and summary is incorporated herein by reference in its entirety.

REFERENCE SIGNS LIST 1, 31, 41, 51: air suspension system; 2: front wheel-side air suspension; 5, 43: front supply-discharge valve (front wheel-side switching section); 6, 34: front switching valve (front wheel-side switching section); 7: rear wheel-side air suspension; 10: rear supply-discharge valve (rear wheel-side switching section); 12A: front first vent line (vent passage); 15: second switching valve (rear wheel-side switching section); 17, 58: compressor; 27, 71: tank; 30: controller (control unit); 53A: front vent line (vent passage).

The invention claimed is:

1. An air suspension system comprising:
   a front wheel-side air suspension and a rear wheel-side air suspension which are interposed between a vehicle body and associated axles to perform vehicle height adjustment in response to supply and discharge of air;
   a compressor configured to compress air; and
   a tank configured to store air compressed by the compressor;
   wherein, when a front wheel-side vehicle height and a rear wheel-side vehicle height are to be raised simultaneously with each other,
   either one of the front wheel-side air suspension and the rear wheel-side air suspension is supplied with compressed air from the tank without passing through the compressor, and
   the other of the front wheel-side air suspension and the rear wheel-side air suspension is supplied with compressed air from the tank after the compressed air has been pressurized by the compressor.

2. The air suspension system of claim 1, further comprising:
   a front wheel-side switching section configured to switch a communication state between the front wheel-side air suspension and the tank;
   a rear wheel-side switching section configured to switch a communication state between the rear wheel-side air suspension and the compressor;
   a vent passage configured to lead compressed air stored in the tank to a suction side of the compressor;
   a first switching valve provided in the vent passage; and
   a control unit configured to control supply and discharge of compressed air to and from the front wheel-side air suspension and the rear wheel-side air suspension by controlling the front wheel-side switching section, the rear wheel-side switching section, and the first switching valve;
   wherein, when the vehicle height is to be raised by the front wheel-side air suspension and the rear wheel-side air suspension,
   the front wheel-side switching section is switched to provide communication between the front wheel-side air suspension and the tank, thereby allowing compressed air in the tank to be supplied to the front wheel-side air suspension, and
   the rear wheel-side switching section and the first switching valve is switched to provide communication between the rear wheel-side air suspension and the tank through the vent passage and the compressor, thereby allowing compressed air in the tank to be supplied to the rear wheel-side air suspension after the compressed air has been pressurized by the compressor.

3. The air suspension system of claim 2, wherein the front wheel-side switching section is a 3-port, 2-position valve.

* * * * *